(12) United States Patent
Cody et al.

(10) Patent No.: US 11,689,656 B2
(45) Date of Patent: Jun. 27, 2023

(54) COMPUTING DEVICE AND SYSTEM FOR RENDERING CONTACT INFORMATION THAT IS RETRIEVED FROM A NETWORK SERVICE

(71) Applicant: Neustar, Inc., Reston, VA (US)

(72) Inventors: Tim Cody, Reston, VA (US); Guido Jonjie S. Sena, Jr., Reston, VA (US); Ken Politz, Reston, VA (US); John Devolites, Reston, VA (US); Michael Cooley, Reston, VA (US)

(73) Assignee: NEUSTAR, INC., Reston, VA (US)

( * ) Notice: Subject to any disclaimer, the term of this patent is extended or adjusted under 35 U.S.C. 154(b) by 0 days.

(21) Appl. No.: 17/228,074

(22) Filed: Apr. 12, 2021

(65) Prior Publication Data

US 2022/0070294 A1    Mar. 3, 2022

Related U.S. Application Data

(63) Continuation of application No. 16/775,160, filed on Jan. 28, 2020, now Pat. No. 10,979,560, which is a continuation of application No. 15/949,944, filed on Apr. 10, 2018, now Pat. No. 10,547,739, which is a continuation of application No. 15/295,994, filed on Oct. 17, 2016, now Pat. No. 9,955,003.

(60) Provisional application No. 62/242,851, filed on Oct. 16, 2015.

(51) Int. Cl.
*H04M 3/42* (2006.01)
*H04M 1/57* (2006.01)
*H04M 1/663* (2006.01)
*H04M 3/493* (2006.01)
*H04M 1/7243* (2021.01)

(52) U.S. Cl.
CPC ....... *H04M 3/42059* (2013.01); *H04M 1/575* (2013.01); *H04M 3/42042* (2013.01); *H04M 1/663* (2013.01); *H04M 1/7243* (2021.01); *H04M 3/4931* (2013.01); *H04M 2203/354* (2013.01)

(58) Field of Classification Search
CPC ............ H04M 3/42059; H04M 1/575; H04M 3/42042; H04M 1/663; H04M 1/7243; H04M 3/4931; H04M 2203/354
See application file for complete search history.

(56) References Cited

U.S. PATENT DOCUMENTS

| | | | |
|---|---|---|---|
| 9,208,495 B2 | 12/2015 | Altberg et al. | |
| 9,955,003 B2 | 4/2018 | Cody et al. | |
| 10,547,739 B2 * | 1/2020 | Cody | H04M 3/42042 |
| 10,979,560 B2 | 4/2021 | Cody et al. | |
| 2003/0156693 A1 | 8/2003 | Goldman et al. | |
| 2007/0026852 A1 * | 2/2007 | Logan | H04M 1/72445 |
| | | | 455/422.1 |
| 2008/0045234 A1 | 2/2008 | Reed | |

(Continued)

*Primary Examiner* — Diane D Mizrahi
(74) *Attorney, Agent, or Firm* — Sterne, Kessler, Goldstein & Fox P.L.L.C.

(57) ABSTRACT

A contact information system provides an independent network authority for providing contact information in connection with incoming calls or messages. The contact information system utilizes a database of communication identifiers to provide contact information for end user devices that receive incoming communications which specify communication identifiers that are stored in the database.

20 Claims, 5 Drawing Sheets

(56) References Cited

U.S. PATENT DOCUMENTS

| | | |
|---|---|---|
| 2009/0097631 A1 | 4/2009 | Gisby et al. |
| 2014/0338006 A1 | 11/2014 | Grkov et al. |
| 2017/0111498 A1 | 4/2017 | Cody et al. |
| 2018/0206124 A1 | 7/2018 | Mahaffey et al. |
| 2018/0338039 A1 | 11/2018 | Cody et al. |

* cited by examiner

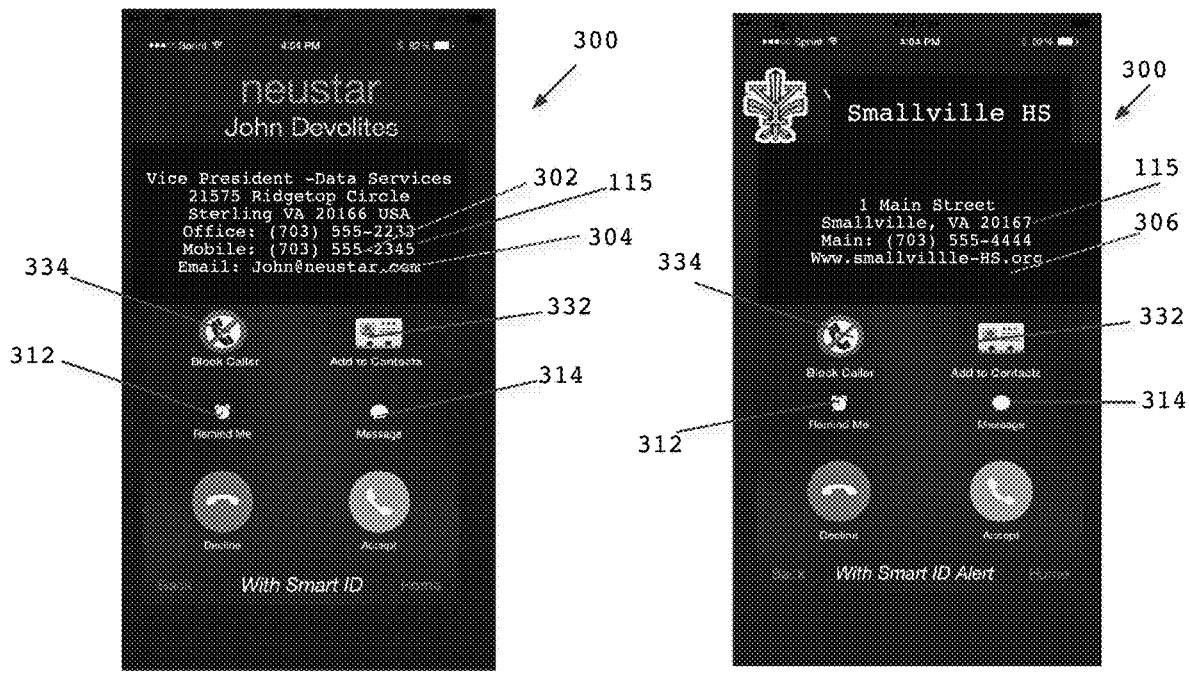
FIG. 3A
FIG. 3B
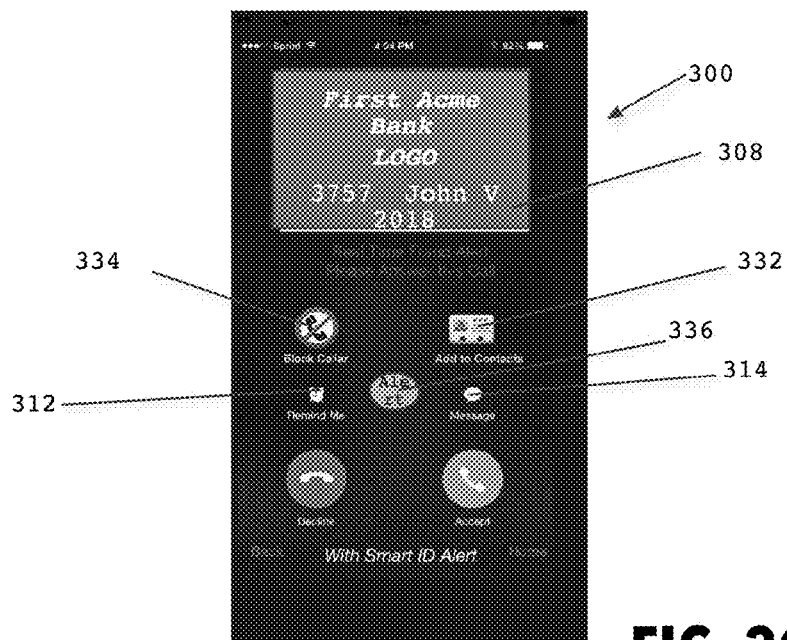
FIG. 3C

COMPUTING DEVICE AND SYSTEM FOR RENDERING CONTACT INFORMATION THAT IS RETRIEVED FROM A NETWORK SERVICE

CROSS-REFERENCE TO RELATED APPLICATIONS

This application is a Continuation of U.S. patent application Ser. No. 16/775,160, filed Jan. 28, 2020, which is a Continuation of U.S. patent application Ser. No. 15/949,944, filed Apr. 10, 2018, which is a Continuation of U.S. patent application Ser. No. 15/295,994, filed Oct. 17, 2016; which claims benefit of priority to Provisional U.S. Patent Application No. 62/242,851, filed on Oct. 16, 2015; the aforementioned priority applications being hereby incorporated by reference in their respective entirety for all purposes.

BACKGROUND

Caller identification, or "caller id" is a telephonic service that has been present for a number of years. Prior to network-enabled telephonic devices, such services used the Public Switch Telephone Network ("PSTN") to deliver the caller information at the time the call was received. With the advance of mobile telephony devices in particular, caller information has increasingly been displayed via locally stored contact information.

Conventional approaches also exist where the caller information is inserted as additional data accompanying an incoming call at a network node associated with the receiving device. For example, cellular carriers and service providers have previously inserted caller information into the data stream of an incoming call.

BRIEF DESCRIPTION OF THE DRAWINGS

FIG. 3A through FIG. 3C illustrate variations of a phone application interface for displaying caller information provided from a caller information system, according to one or more examples.

DETAILED DESCRIPTION

Figure 1:
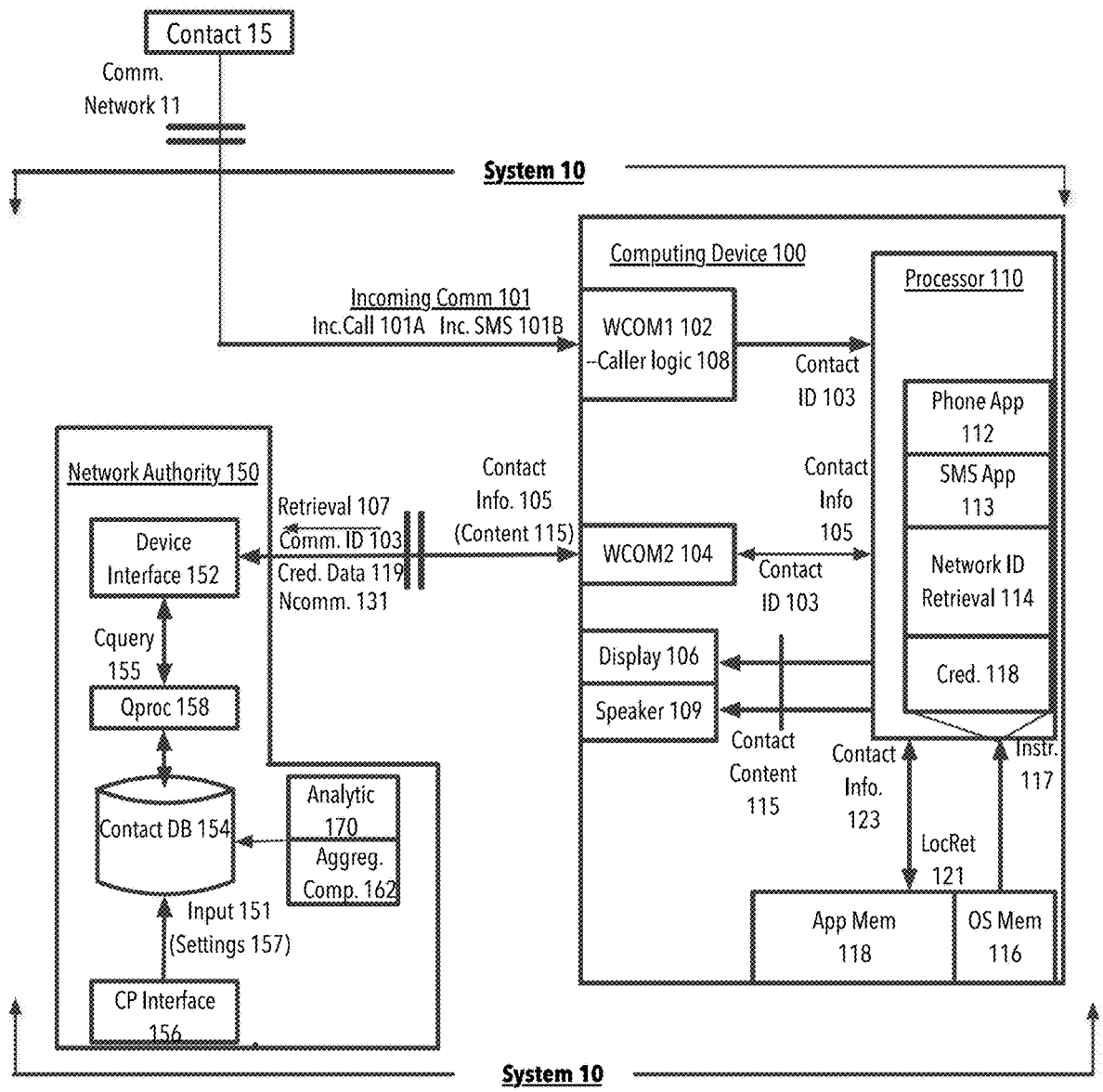
FIG. 1 illustrates a computing device and system for rendering caller information from an authoritative caller information service, according to one or more examples.

Examples described include a computing device that operates to perform a retrieval process in which an operating system component retrieves contact information associated with an incoming communication. According to some examples, the incoming communication may specify a phone number as a communication identifier. By way of further example, the incoming communication may correspond to an incoming call connect, Multimedia Message Service message (MMS) Short Message Service message (SMS), communicated over one or more of a public, cellular network or Internet Protocol ("IP") communication medium.

Still further, in some examples, a contact information system is provided to provide an independent network authority for contact information. The system may include one or more computers that utilize a database of phone numbers in providing contact information to end user devices that receive incoming communications which utilize phone numbers stored in the database.

According to some examples, one or more computers implement an independent network authority by providing a contact party interface to enable a plurality of entities that are each an authorized user of a corresponding phone number, to specify contact information to render on end user devices when end user devices receive incoming communications from that entity's phone number. The one or more computers further implement the network authority by fielding retrieval requests from a plurality of end user devices, in which each of the plurality of end user devices generate a retrieval request that specifies a phone number of an incoming communication received on that device. For each retrieval request, the one or more computers identify, from the database, contact information associated with the phone number of the retrieval request. The one or more computers transmit the contact information to the end user device that generated the retrieval request.

According to some examples, a computing device is enabled to use a network communication medium, separate from a telephony network and/or channel on which the incoming call is received ("PSTN" or cellular voice channel), in order to retrieve caller information (e.g., "Caller ID") from an independent authority where such information is stored and validated.

Among other benefits, contact information can be rendered on a computing device, in connection with an incoming communication (e.g., incoming call, incoming, new SMS message or new MMS message) subject to rules and/or legal requirements of the independent network authority where such information is stored. In this respect, information for a contact that initiates the communication can be ensured as being valid and authentic, in that the information rendered on the computing device originates from the network authority.

In some variations, a computing device is enabled to retrieve sender contact information from an independent network authority, to render in connection with a newly received message. The sender contact information may be trusted as identifying the sender, as it is provided from the independent network authority. The newly received message may correspond to a message communicated under, for example, a Short Message Service ("SMS"), Multimedia Media Message ("MMS"), or message communicated using an alternative messaging transport. The computing device may retrieve and render the contact information to display as part of the message header when the message is listed as an item in a messaging box or folder of the computing device. As an addition or alternative, the sender contact information may be displayed with a rendered a portion of the message in an open state.

As described with various examples, the network authority can implement a caller and/or sender contact information service that (i) enables the service to access and use validated information about entities whom are associated with phone numbers or other communication identifiers, and (ii) complies with rules and/or laws that ensure the contact information provided through the service is valid and authentic.

In some examples, the contact information service implemented through the network service can operate in connection with operating system level functionality of computing devices which receive incoming calls. In this regard, some examples include a contact information platform for use with devices that receive incoming calls and messages. In some variations, the contact information platform may include or operate with a network retrieval component that is implement as an operating system level component of a computing device. In other variations, the network retrieval component may be implemented as an application or application level component. On a computing device, the network retrieval component performs a network retrieval function to access the contact information service when an incoming call or message is received.

When implemented as an operating system level component, the network retrieval component can provide additional security to prevent, for example, other third-party providers (e.g., cellular carries) from circumventing the independent network authority, while providing a similar service. Thus, for example, a caller may not be able to avoid having its caller information displayed on a computing device when the caller initiates a phone call using an associated phone number. Depending on implementation, the caller contact information (or sender contact information) can identify the caller (or sender) name (e.g., corporation, individual, organization), caller contact information (e.g., phone number being used for call or message, alternative phone number, email address or messaging handle), or caller/sender contact category (e.g., "solicitation", "important" "residential" etc.). Still further, the caller or sender contact information can be rich, such as provided through formatted text data, image, and other media. In some variations, the caller or sender contact information can also include, or be transformed on the receiver device, to include functional data items that trigger automated and/or programmatic actions.

According to some examples, a computing device can be configured with operating system level functionality to cause the computing device to access the network authority when an incoming call is received. In variations, the computing device can perform a multi-step retrieval process which includes first checking a local or trusted user-specific data store (e.g., contact records stored on device) in order to determine whether caller information exists for the incoming call. If no caller information exists, then the mobile computing device performs, as part of the retrieval process, a network retrieval to access the caller information from the network authority.

A platform as described, which includes the operating system level functionality which enables the network retrieval, can be optimized or otherwise configured to minimize latency and network retrieval time, in order to ensure a caller or sender contact information is timely displayed (e.g., before the time the user is likely to notice or respond to the incoming call). In variations, a computing device can perform the network retrieval asynchronously so as to populate, for example, (i) a call log with caller contact information from the network authority after a call has been answered or passed through to voicemail, or (ii) an entry of a messaging folder, representing a messaging item transmitted by a sender, with sender contact information provided from the network authority.

According to some examples, a computing device includes an operating system that includes functionality for performing a retrieval process to a caller or sender contact information service operated by a network authority. The caller or sender information service may provide trusted (e.g., valid and authentic) caller or sender contact information. In some examples, the computing device operates to retrieve caller contact information for an incoming call from the caller information service.

In some examples, the inclusion of operating system level functionality can specialize a computing device on which a retrieval for caller/sender contact information is performed automatically in connection with an incoming call or newly received message. Among other benefits, such operating system level functionality can be implemented without an ability of third-parties to deviate from the implemented functionality. While some variations provide for a user to specify settings as to the performance of functionality as described (e.g., whether caller information retrieval is "on" or "off"), examples may be implemented to preclude other parties (e.g., carrier, caller, user) from altering the functionality implemented at the operating system level. For example, when the network retrieval is performed in connection with an incoming call, examples provide that the computing device uses a network connection to access the network authority, and no other third-party source, in order to determine the caller information for the incoming call. Likewise, in some examples, caller information originating from a source other than network authority, or in some variations, the local resources of the user, may be suppressed or otherwise precluded from being rendered as being inauthentic.

One or more aspects described herein provide that methods, techniques and actions performed by a computing device are performed programmatically, or as a computer-implemented method. Programmatically means through the use of code, or computer-executable instructions. A programmatically performed step may or may not be automatic.

One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Furthermore, one or more aspects described herein may be implemented through the use of instructions that are executable by one or more processors. These instructions may be carried on a computer-readable medium. Machines shown or described with figures below provide examples of processing resources and computer-readable mediums on which instructions for implementing some aspects can be carried and/or executed. In particular, the numerous machines shown in some examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, aspects may be implemented in the form of computer programs.

System Overview

FIG. 1 illustrates a computing device and system for rendering caller or sender contact information (collectively or alternatively "contact information") from a trusted and authoritative contact information service, according to one or more examples. According to an example of FIG. 1, a contact information system 10 includes a computing device 100 and an authoritative contact information system 150. The computing device 100 can correspond to a mobile computing device which includes wireless broadband and cellular connectivity for enabling voice and data network functionality. According to some examples, the computing device 100 can correspond to any device which can receive incoming phone calls and execute functionality to retrieve caller contact information from an independent network authority. According to other examples, the computing device 100 can correspond to any device which can receive messages, such as SMS messages, and execute functionality to retrieve sender contact information from an independent network authority. Still further, in some examples, the computing device 100 can retrieve both caller and sender contact information from the independent network authority, in connection with phone and messaging services provided on that computing device. By way of example, the computing device 100 can include a mobile computing device having capabilities for receiving and initiating phone calls over a cellular connection (e.g., voice channel), PSTN connection and/or IP connection. In some variations, the computing device 100 can include a mobile computing device having capabilities for receiving messages (e.g., SMS messages) over a cellular or IP network channel. Such mobile computing devices may also perform other types of operations, such as data network operations (e.g., Internet browsing) using a Wireless Fidelity (e.g., 802.11(a), 802.11(b), 802.11(g), 802.11(n), Wi-Fi Direct, etc.) or cellular connection. In variations, the computing device 100 can be implemented under alternative computing platforms, such as either a personal computer (e.g., desktop or laptop computer), a dedicated telephony device with data network connectivity, or a cable box or service with Voice-Over Internet Protocol ("VOIP") telephony.

The contact information system 150 can be implemented through an authoritative provider in order to provide a secure and trusted database service for computing devices on which telephony and/or messaging operations are performed. When implemented in connection with telephony services, the contact information system 150 provides independent and trusted caller contact information to the computing device 10 when the computing device 10 receives incoming calls. When implemented in connection with messaging services, the contact information system 150 provides independent and trusted sender contact information to the computing device 10 when the computing device receives a new message. According to one aspect, the contact information system 150 can represent a platform and carrier independent service that is implemented under rules which subjugate the providers of hardware resources (e.g., device manufacturer), software resources (e.g., operating software manufacturer), and network services (e.g., cellular provider) with respect to specific aspects of telephony services (e.g., voice connections made through the PSTN), and specifically with respect to behavior of the phone application when an incoming phone call is received. As described in greater detail, the contact information system 150 can provide a secure network communication source for providing caller or sender contact information over a data network connection. In this way, a receiving device is able to display caller contact information for an incoming call from a trusted and authoritative source. As an addition or variation, the receiving device is able to display sender contact information for a new message from the trusted and authoritative source. In an example of FIG. 1, the computing device 100 can form a secure network connection with the contact information system 150 over the Internet, using a network port as described below, in order to retrieve and display the contact information in context of an incoming call or new message.

In an example of FIG. 1, the computing device 100 includes a cellular port 102, a wireless network port 104, a display 106, a speaker 119, and a processor 110. Additionally, the computing device 100 can include one or more kinds of memory resources, such as provided by operating system memory 116 (e.g., Read Only Memory or "ROM")) and application memory 118 (e.g., Random Access Memory or "RAM"). The cellular port 102 can enable cellular voice communications, while the wireless network port 104 enables, for example, high-bandwidth wireless (or network) communication suitable for Internet protocol ("IP") data communication applications and resources (e.g., an 802.11 protocol, or "Wi-Fi"). Still further, the wireless network port 104 can also be used for voice communications using a wireless medium such as Wi-Fi. For example, some service providers can enable voice or data communications through non-cellular wireless communication ports (e.g., cellular service providers can enable voice calls to be received or made through a Wi-Fi connection). In some implementations, the selection of the particular communication port can be made dependent on the factors such as the device location, the device's connection quality or strength through the respective communication ports, user preference, device software or hardware resources, or other considerations. In other variations, the cellular port 102 can enable both voice and data communications for purpose of implementing an example of system 10. Additionally, in some variations, the computing device 100 can utilize a telephony port, such as a wireline interface for the communication network 11, rather than, for example, cellular port 102 to receive and transmit calls. Thus, in implementation, the computing device 100 can have more or fewer communication ports, with each communication being enabled for voice, data or voice and data. Moreover, one or more additional communication ports can be included with the computing device 100 for enabling communications using alternative wireless or wireline communication mediums.

In an example of FIG. 1, the computing device 100 may execute instructions 117 for operating a phone application 112, with a network retrieval component 114 being integrated or functionally linked to the phone application 112. As an addition or alternative, the computing device 100 executes the instructions 117 for operating a messaging application (SMS application 113), with the network retrieval component 114 being integrated or functionally linked to the messaging application. In either implementation, variations implement the network retrieval component 114 as an operating system level component for the phone application 112 and/or the SMS application 113.

In some examples, the operating system memory 116 may maintain device credential 118, in the form of an encrypted datum that identifies and/or validates the computing device 100 and/or the user of the computing device 100. In some implementations, the network retrieval component 114 can be an integrated functional element or aspect of the phone application 112 or the SMS/MMS application 113. In this regard, the phone application 112, SMS/MMS application 113, and/or the network retrieval component 114 are implemented as operating level functionality on the computing device 100. In variations, the application memory In operation, the computing device 100 receives an incoming communication from a contact device 15. The incoming communication may be an incoming call connect 101A or a new message 101B. The incoming communication 101 may be received on the computing device 100 via, for example, the communication network 11. In response to receiving the incoming communication 101, the computing device 100 determines a communication identifier for the incoming communication 101 (e.g., phone number), and then uses the communication identifier to perform a separate network retrieval from the independent network authority 150 to obtain contact information 105 for the contact (e.g., caller or sender) of the incoming communication 101. In some examples, the incoming communication 101 is a call connect 101A, and the contact information 105 is obtained and displayed to augment or replace, for example, conventional caller identifier information. In variations, the incoming communication 101 is a new message 101B, and the contact information is obtained and displayed as part of, for example, the message header or identifier when the message is listed in a folder (e.g., inbox) or opened for viewing. As described in greater detail, the contact information 105 may include rich content (e.g., logos and images, text, textual information about the contact, etc.) that is created and/or configured by the contact. In this way, the network authority 150 enables entities who are owners or holders of communication identifiers to specify contact information 105 that is displayed on their behalf when those entities perform a corresponding communication activity (e.g., make a phone call, send a message). Furthermore, the rendering of the contact information 105 on the computing device 100 provides confirmation to the receiver regarding the identity of the contact who is responsible for the incoming communication 101.

In one implementation, the cellular port 102 and/or processor 110 can include or operate with caller logic 108 and/or messaging logic 109. The caller logic 108 may be implemented to detect, process and receive the respective incoming call 101A, and further to determine the communication identifier 103 of the caller or sender (e.g., phone number). The messaging logic 109 may be implemented to similarly receive and process incoming messages (e.g., SMS messages). While an example of FIG. 1 depicts the incoming communication 101 as being received on the cellular port 102, in variations, the incoming communication can be received on an alternative communication port, such as the wireless network port 104 (e.g., Wi-Fi port or wireline port). Thus, as an addition or variation, the caller logic 108 can be provided on the wireless network port 104 (or other communication port) to receive the incoming call 101A, and to determine information from the incoming call, such as caller communication identifier 103. Additionally, some variations provide for the messaging logic 109 that resides on cellular port 102 or wireless network port 104 (or other communication port) to receive a new message 101B (e.g., SMS), and to determine information from the new message, such as sender communication identifier 103.

In response to receiving the incoming communication 101, the processor 110 sends an outgoing retrieval communication 107 to contact information system 150. The outgoing retrieval communication 107 may include the communication identifier 103 of the incoming communication 101, as well as credential information 119 associated with the computing device 100. The credential information 119 can be based or derived from the credential 118 that is stored on the computing device 100. In some examples, the credential 118 can include a token or key which is dedicated for use with the contact information system 150. In response to transmitting the outgoing retrieval communication 107, the computing device 100 may receive the contact information 105 from the contact information system 150. The contact information is provided to the computing device 100 in a form that is renderable on the platform of the computing device 100, and for an appropriate context (e.g., call screen or with messaging item). In the case of an incoming call, the contact information 105 can be rendered while the incoming call 101A is being received, but before the incoming call is connected (e.g., before the user answers the call).

In an implementation in which the contact information 105 is retrieved for the new message 101B, the contact information 105 may be retrieved and displayed simultaneously with, for example, a message notification generated on the computing device 105. In such examples, the messaging application 113 of the computing device 100 may operate to suppress the message notification until the contact information 105 is retrieved, or until a retrieval operation is performed. In some examples, a background process is triggered by the messaging logic 109 to manage retrieval and inclusion of contact information with the header or other portion of the newly received message. In variations, the messaging application 113 can trigger the network retrieval asynchronously, or independently of a corresponding message notification, and then render a message header of the new message with the contact information 105 when the messaging application is operated to display new messages.

In an example of FIG. 1, the outgoing retrieval communication 107 is communicated to contact information system 150 using the wireless network port 104. In some operational environments, the configuration provides a benefit of the outgoing retrieval communication 107 being transmitted using a high-bandwidth communication medium, so as to minimize latency in the receipt of the contact information 105. In some implementations (e.g., when Wi-Fi is not available), the cellular port 102 can also be used to communicate the retrieval communication 107 and to receive the contact information 105. Still further, alternative configurations can be implemented such that the cellular port 102 is used to transmit the outgoing retrieval communication 107 when the incoming communication 101 is received on either the cellular port 102 or wireless network port 104.

According to some examples, the contact information system 150 can include functionality such as shown by device interface 152 and contact information database 154. The device interface 152 can process requests corresponding to network retrieval operations performed on individual computing devices. The contact information database 154 can correspond to, for example, a database structure which maps communication identifiers (e.g., phone numbers, account messaging identifiers) to contact information. As described with some examples, the contact information database 154 can obtain caller or sender contact information from a variety of sources. The device interface 152 can receive the retrieval communication 107 and identify the communication identifier 103 as part of a query 155. The caller query 155 can be handled by a query processing component 158, which references the communication identifier 103 with corresponding caller information 105 that is provided in the contact information database 154.

In implementations which display caller contact information, computing device 100 can receive the contact information 105 from the contact information system 150 when the incoming call 101A is received. The contact information 105 can be rendered while, for example, an incoming call 101A is pending on the computing device 100. In some implementations, caller contact information 105 is rendered on the computing device 100 before the call is shown to the user, or alternatively, before the call is answered. In the latter implementation example, the incoming call 101A can be displayed briefly without caller information, then displayed with caller information when received. In such examples, the incoming call 101A can be received and held as pending through the phone application 112 while the network retrieval component 114 retrieves the caller contact information 105. In some variations, the phone application 112 can suppress user-interface features, such as those used to display caller information 105, until the caller information is received from the contact information system 150. The processor 110 receives the caller information 105 via the wireless network port 104, and then renders caller content 115 based on the retrieved caller contact information 105. The caller content 115 can be based on or derived from the caller contact information 105. The caller content 115 can be rendered as text or media using the display component 106. In variations, the caller content 115 can be generated in whole or in part as audio output.

In some variations, the phone application 112 includes logic to control when the network retrieval component 114 performs the retrieval operations. In one implementation, the processor 110 performs a retrieval process in which an initial determination is made as to whether the incoming communication 101 is associated with a contact record on the computing device 100. In one implementation, the phone application 112 or messaging application 113 can initiate a local retrieval 121 query from the application memory resource 118 when the incoming call 101 is received. In one implementation, the local retrieval query 121 can check locally stored application data, such as call logs or contact records, for contact information 123 that matches the communication identifier (e.g., phone number). In a variation, a local retrieval query 121 can be communicated to a connected resource of the computing device, such as another connected device. If, for example, the local retrieval query 121 fails to generate a result, the phone application 112 (or other operating system level logic) can trigger the network retrieval component 114 to query the contact information system 150.

In some variations, the network retrieval component 114 initiates transmission of the retrieval communication 107 concurrently with performance of the local retrieval 121. Thus, the computing device 100 may receive the contact information 105 with the contact information 123 from a locally stored contact. In such implementations, the phone application 112 can implement a prioritization or rule-based process to suppress information from one source (e.g., caller information 105) over information from another source, or to display both sets of information (e.g., caller information and contact information 123) together. Thus, the contact content 115 can be based on both the contact information 105 and the contact information 123. Thus, in some variations, the outgoing retrieval communication 107 can be transmitted regardless of whether a contact record exists with the resources of the computing device 100.

In such an example, the rendering of the contact information 105 as contact content 115 can be determined or based at least in part on whether the computing device 100 has contact information associated with the communication identifier 103.

Caller Information Services

In one example, the contact information system 150 can include, or operate in connection with, an aggregation component 162. The aggregation component 162 can represent one or more aggregation processes which access various databases and resources for contact information in order to aggregate caller information (e.g., phone number and caller identifier). In this way, the aggregated caller information can originate from sources, such as governmental registries and/or commercial corporate databases (e.g., such as provided by DUN & BRADSTREET or LINKE-DIN). Accordingly, in some examples, the aggregation component 162 can be implemented using source-specific connectors, in combination with a set of database retrieval queries which retrieve contact information. The aggregation component 162 can also determine if caller information already exists for when caller information is retrieved on an ongoing basis for phone numbers and entities. If the aggregation component 162 determines that contact information for a phone number exists, the aggregation component 162 can determine to update or augment the existing caller information using predetermined logic. For example, the predetermined logic can prioritize or sort caller information based on associated attributes or parameters of the entity associated with the corresponding phone number.

As an addition or alternative, the contact information system 150 can include a contact party interface 156 which enables a calling or messaging party user (e.g., representative or agent of a calling party) to provide various inputs 151, including content input to specify contact content 155. For example, the contact party interface 156 can correspond to a manual or programmatic interface which enables a contact entity (e.g., corporate entities, organizations, or person) to create, configure, modify or augment information about the entity for display on a receiving device at the time the contacting entity initiates a phone call or sends a message. The contact party interface 156 can enable a calling party to create new information elements for their own contact information, as well as specify design elements of the caller information (e.g., appearance, logo, formatting, etc.). In some examples, the information provided through the contact party interface 156 can be validated by manual or programmatic resources of the authoritative entity. Among other types of information, the contact party interface 156 can enable a contacting party to specify what information (e.g., type, kind, etc.) is displayed to a receiving party when the contacting party initiates a phone call, as well as the appearance such information is to have on the receiving device. As another example, the contact party interface 156 can enable the contacting party to specify content elements, such as logo images, for display in connection with a transmitted message (e.g., SMS message). The specified contact element can be included with, for example, a message header of an outgoing message to the end user device, so that the contact element is visible as part of a user's message inbox or folder.

In other examples, the calling party interface 156 can receive preferential settings 157 which can define a condition by which one or more contact-specified content elements are to be displayed in connection with an initiated call or outgoing message of that contact. For example, a contact may correspond to an individual, who can specify a preferential setting 157 that corresponds to a time setting (e.g., time of day and/or a day of the week). In some implementations, the preferential setting 157 may specify durations of time (e.g., weekdays 9:00 am-6:00 pm) during which select contact-specified content is to be used for calls initiated by the contact. Among other benefits, such implementations enable individuals to have dual-purpose mobile devices, such as for work/business and personal. When the user makes a call within a duration specified by the user's preferential setting 157, contact information system 150 may retrieve contact content for the caller that is for the business that employs the caller, while a call outside of the specified setting may result in contact information system 150 retrieving content that identifies the individual making the call.

Still further, in some examples, contact information system 150 may include analytic logic 170 to monitor usage of communication identifiers by callers or senders. For example, if an extraordinary number of retrieval requests are specified for a particular phone number by a population of device users within a given time frame (e.g., an hour or a day), the analytic logic 170 may detect the occurrence and proactively flag or indicate the communication identifier as being associated with a solicitation service. In subsequent retrieval requests from the population of users, contact information system 150 returns contact information which includes, or otherwise identifiers the caller or sender as a likely solicitor. In this way, contact information system 150 can proactively identify likely solicitors to computing devices 100 of a population in connection with unwanted phone calls or messages. The users of the computing devices may further employ filters to, for example, preclude receipt or handling of incoming communications from the contacts who are deemed to be solicitors.

Device Functionality for Use with Caller Information Service

In some examples, the processor 110 executes the instructions 117 to generate a set of user interface features when the caller information content 115 is rendered. The user interface features can generate prompts for user input when the caller information content 115 is rendered. When user input is received in connection with a given user interface feature, the processor 110 may be triggered to perform a set of operations which utilize the caller information 105. By way of example, the set of operations can include (i) storing information provided from the caller information 105 as part of a local contact record on the computing device 100, using the application memory resources 118, and/or (ii) generating a network communication that reports information about the incoming call 101 to the authoritative entity or other network service.

According to one implementation, the processor 110 can store the caller contact information 105 as a contact record 127 using, for example, the application memory resources 118. Alternatively, the caller information 105 can be used to augment an existing contact record 127. For example, the caller contact information 105 can include information which may not exist in the contact record of the user of the computing device 100.

Still further, a user interface feature can be generated through the phone application 112 to generate a network communication 131 which reports information about the incoming call 101A. The network communication 131 can, for example, be signaled in response to user input when the incoming call 101A is unsolicited or not authentic. For example, when the caller information content 115 is rendered on the display component 106 of the computing device 100, a user interface feature (e.g., see network notification feature 336, FIG. 3C) can be displayed to enable the user to mark a complaint with the incoming call. For example, the call may be an unwanted solicitation, or from a caller who is masking their true origin. The user can interact with a network notification feature 336 (see FIG. 3A through FIG. 3C) to signal their complaint. The processor 110 can then generate the network communication 131 to a corresponding network location, such as provided by the contact information system 150. In some variations, the user may be prompted to enter information regarding the nature of the communication, such as the basis of the user's complaint.

In this way, the network communication 131 can be generated by the user as a mechanism to report a complaint. In one example, the network communication 131 can be communicated via the wireless network port 104 to the contact information system 150. The network communication 131 can be recorded in association with the caller information 105 for the incoming call 101.

In some examples, the contact information system 150 can record instances when network communication 131 are generated for a particular phone number, or alternatively for a particular entity which may manage multiple phone numbers. The contact information system 150 can tabulate instances when the network communications 131 are generated from different devices. When, for example, the number of communications 131 exceed a threshold, the associated phone number which generated the communications (e.g., complaints) from the various devices can be flagged as being problematic (e.g., unsolicited caller).

Caller Interface Examples

FIG. 3A through FIG. 3C illustrate variations of a caller interface 300, according to one or more examples. In examples shown, the caller interface 300 is shown to display different types of caller content 115 when a corresponding incoming call is received. The caller interface 300 can be triggered for display on the display component 106 when an incoming call 101A is initially received.

With reference to FIG. 1 and FIG. 3A through FIG. 3C, the caller interface 300 can be used to display caller contact content 115, which can include, for example, (i) alternative phone numbers 302 which a receiving party can use to contact the calling party; (ii) messaging identifiers 304 for use by a receiving party to message the calling party, (iii) a website 306 or network location where additional information about the calling party is made available, (iv) a logo 308, including an image or other media content for rendering on the computing device of the receiving party. In some variations, the caller interface 300 can include a set of user interface features 312, 314 which are actionable with user input in order to cause the processor 110 to perform a predetermined set of actions using the caller contact information 105.

As described with other examples, the caller interface 300 can also include actionable user interface features for enabling the computing device 100 to perform an action using or based on the displayed caller information 105. In examples of FIG. 3A through FIG. 3C, a contact feature 332 can be provided which the user can interact with in order to store the caller contact information 105 with or as part of a new contact record. In this way, the user can, for example, store alternative phone numbers, message identifiers, and websites of a calling party. Another example of an actionable feature 334 is a local caller block function, which the user can use to block future incoming calls from the same phone. The actionable feature 334 may also be used in examples in which contact information system 150 proactively indicates an incoming call is a solicitation.

In another variation, the caller interface 300 can include the network notification feature 336 which the user can interact with in order to generate, for example, the network communication 131. As described with other examples, the network notification feature 336 can provide a mechanisms by which the caller can signal a complaint about the incoming caller. When the user interacts with the notification feature 336, one example provides that the network communication 131 is sent to the contact information system 150 (e.g., via the cellular port 102 or the wireless network port 104) that identifies the communication identifier 103, as well as a value or data element provided through the notification feature 336 which indicates the user is complaining about the caller. The contact information system 150 can record information about the event, such as the occurrence of the event, the time the event occurred, and/or the user or computing device which made the complaint.

As described with other examples, the contact information system 150 can include logic, such as rule based logic, which tallies or aggregates complaints for individual callers, such as by phone number or caller identifier of the caller. The contact information system 150 can implement rules, for example, which provide that if a particular caller (e.g., organization responsible for a particular number) receives too many complaints in total, or if a caller receives too many complaints in a given duration of time (e.g., 1 month), remedial action can be taken such as the caller being warned or fined.

In variations, the actionable feature 334 can serve dual roles in which the user can block the caller from calling the user's computing device, as well as providing a mechanism in which the user's interaction with the feature results in the network communication 131 being communicated to the contact information system 150. The contact information system 150 can then implement logic to determine when/if remedial actions are needed against the caller.

Message Interface Examples

Figure 4:
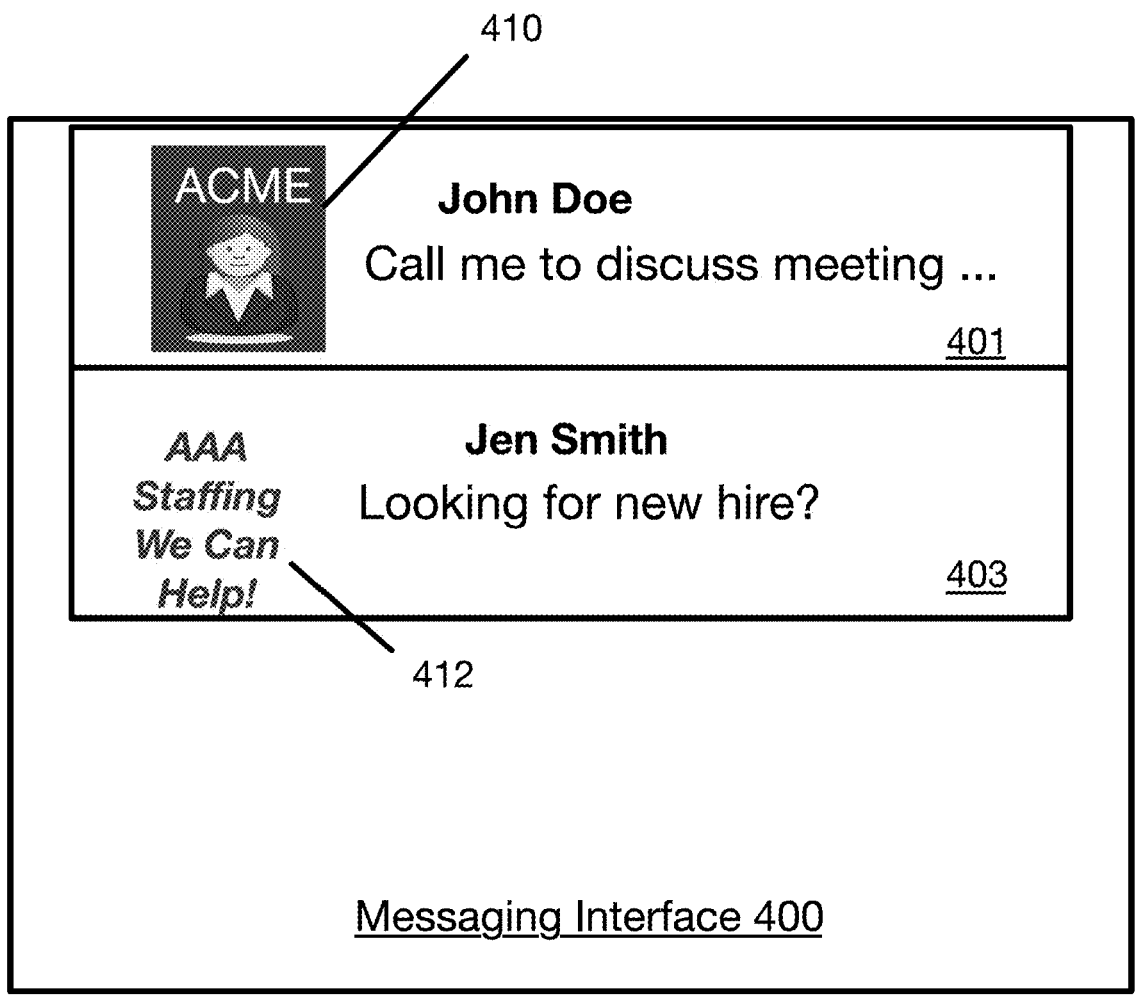
FIG. 4 illustrates an example message interface for displaying sender contact information provided from a contact information system, according to one or more examples.

FIG. 4 illustrates an example message interface for use with a computing device, according to one or more examples. In an example shown, a message interface 400 is shown to display sender contact information, in the form of content elements 410 which may be specified or selected by the user.

In some examples, the message interface 400 may be implemented for a messaging application which utilize phone numbers as the primary communication identifier. In numerous examples, this is described as an SMS messaging application. In variations, the messaging interface may be provided for proprietary applications, such as iMessage (provided by APPLE INC.). The computing device 100 may receive a new message from, for example, a business, or an individual associated with a business. The computing device 100 may perform the retrieval for sender contact information, as an independent network authority. In some variations, this may be performed when, for example, the messaging application does not recognize the phone number used by the sender.

In some implementations, the retrieved sender contact information 105 may include a logo and/or text content. In variations, the retrieved sender contact information 105 can include an audio jingle, animated picture or other media content item. As with other examples, the contact information 105 may be selected by the sender (or business) who controls or owns the phone number.

In some examples, the computing device 100 includes logic to blend or integrate the retrieved content element with the contents of the message as received on the computing device. For example, logos 410, 412 may be received from the contact information service 150 independent of the respective incoming message 401, 403. The logos 410, 412 may be assembled or integrated into the respective message 401, 403 when the message is displayed in list form with other messages (e.g., as part of an inbox). Thus, the sender can use the contact information system 150 to specify logo or other branding content, which is then displayed on the receiving device, without need for the sender to include the logo or branding content at time of transmission. In some variations, the sender contact information 105 (e.g., logo 410, 412) may also be displayed with other context, including when the message is rendered individually, and/or as part of a message notification which informs the user that a new message has arrived.

Methodology

Figure 2A:
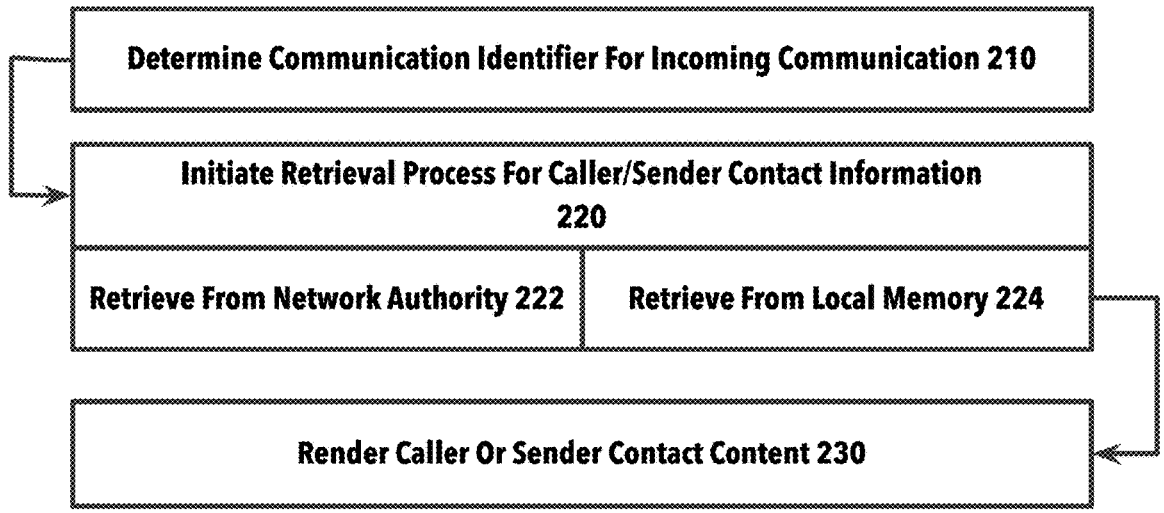
FIG. 2A illustrates an example method for providing a contact information service, according to one or more examples.

FIG. 2A illustrates an example method for implementing a contact information service on a computing device of the user, according to one or more examples. A method such as described with an example of FIG. 2A can be implemented using a system such as described with an example of FIG. 1. Accordingly, reference to elements of FIG. 1 is to illustrate suitable components or elements for performing a step or sub-step being described.

In an example, the computing device 100 receives an incoming communication (e.g., phone call, SMS message) and determines a caller identifier (e.g., phone number) (210).

The processor 110 can initiate a retrieval process for determining the caller or sender contact information, using the communication identifier (e.g., phone number) of the incoming communication 101 (220). In one implementation, the processor 110 performs a local retrieval operation to determine if contact information exists on the computing device 100 which matches the communication identifier (e.g., phone number) of the incoming communication 101 (222). As an addition or alternative, the processor 110 performs a network retrieval operation to retrieve the caller or sender contact information 105 from the contact information system 150 (224). The processor 110 can then render the retrieved caller or sender contact information 105 using the display 106 and/or speaker 109 (230).

OTHER EXAMPLES

While numerous examples are described in the context of an end user device performing a network retrieval at or near a time when an incoming message is received, variations provide that providers of end user devices may alternatively (or additionally) perform network retrievals of the content information system 150 when end user devices of those providers receive the incoming calls or messages. For example, a carrier (e.g., for cellular or VOIP telephony) may perform the network retrieval from the contact information system 150, for an incoming call directed to a customer device prior to, or concurrently with the incoming call being forwarded to the customer device for call handling. In some implementations, the provider (e.g., carrier) may perform the operation on behalf of (or in place of) the customer device.

Figure 2B:
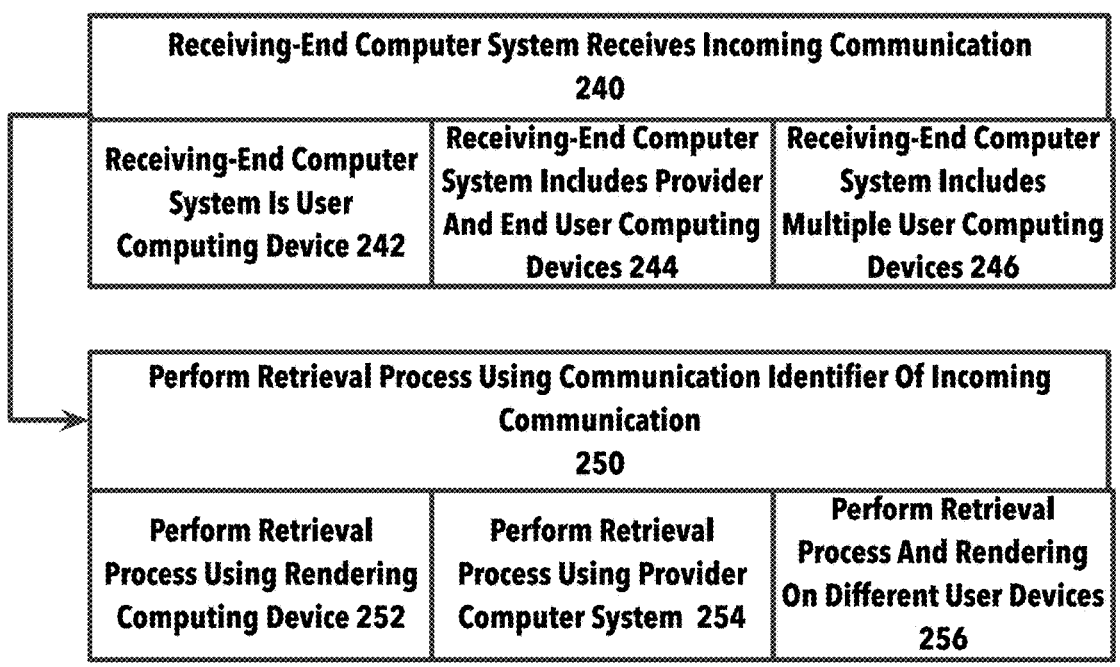
FIG. 2B illustrates an example method for implementing a contact information service on a distributed computing environment of an end user.

In other variations, providers may couple the use of contact information system 150 with other verification services to reduce a number of instances in which the carrier/provider networks are used to conduct unwanted solicitations and/or fraud. Some providers, for example, utilize verification services to ensure a phone number of a caller is not spoofed, but legitimate. In some examples, such providers may further use the contact information system 150 to determine if the caller is a likely solicitor. For example, in one implementation, the contact information system 150 may be integrated or combined with a verification service that returns, to a provider making a retrieval request, a communication that verifies the phone number being used is not spoofed, and confirmation that the phone number is not associated with an entity that is known to make solicitations or commit fraudulent activity. FIG. 2B illustrates an example method for implementing a contact information service on a distributed receiving-end computer system. A method such as described with an example of FIG. 2B may be implemented using functional components such as described with FIG. 1, implemented in part or whole on alternative computing environments, as described in more detail by examples provided below.

In an example of FIG. 2B, a receiving end computer system receives an incoming communication, specifying a communication identifier of a contact who initiated the communication (240). The incoming communication may correspond to, for example, an incoming phone call or message. In some examples, the incoming communication may correspond to a telephony call, initiated by a caller contact and terminated at the receiving computing system using an IP network (e.g., VOIP call). As an addition or alternative, the incoming communication may correspond to, for example, an incoming message, initiated by a sender contact. In some examples, the incoming communication specifies the phone number of the contact (or of the contact's device).

In one implementation, the receiving-end computer system corresponds to a computing device operated by the end user (e.g., computing device 100) (242). Thus, for example, the receiving-end computer system may be implemented as described with an example of FIG. 1.

In a variation, the receiving-end computer system includes a provider computer system and a user computing device (244). Still further, in another variation, the receiving-end computer system includes multiple computing devices operated or controlled by the end user (246).

The receiving-end computer system may use the communication identifier of the incoming communication to perform a retrieval process in order to determine the caller or sender contact information (250). In some examples, the receiving-end computer system perform the retrieval process using a rendering computing device operated by the user, so that the computing device that retrieves the contact information 105 and then renders corresponding content is the same (252).

According to another aspect, the receiving-end computer system performs the retrieval process to obtain contact information 105 from the contact information service 154 using a provider-operated computing system, and the contact information is then forwarded to the end user computing device for rendering (254). For example, the receiving-end computer system may include a carrier server component that implements the retrieval process as part of a verification process, then forwards the incoming communication to the computing device (e.g., cellular or wireless telephony device) of the end user. As another example, the receiving-end computer system may be operated by a VOIP provider who performs the retrieval process to obtain the contact information 105 from the contact information system 154, before or at the time the incoming communication (e.g., phone call) is received. The VOIP provider may then forward the incoming call to a corresponding end user device for handling VOIP calls. In some examples, a first device (e.g., set-top box) receives the incoming communication along with the contact information 105 from the provider component, and then distributes the contact information for rendering on a first device (e.g., television) and a second device (e.g., VOIP phone).

Still further, the receiving-end computer system may include multiple computing devices which are operated by the user, with a first computing device performing the retrieval process to obtain the contact information 105 from the contact information system 154, and a second device rendering content from the retrieved contact information (256). For example, a cable user may operate a set-top box that automatically performs the network retrieval process to obtain the sender or call contact information whenever an incoming communication is received through that device. In the user's computing environment, another computing device (e.g., television) may be used to display the contact information of the caller or sender. Still further, a third device (e.g., dedicated VOIP phone) may be used to receive the communication.

Hardware Diagram

Figure 5:
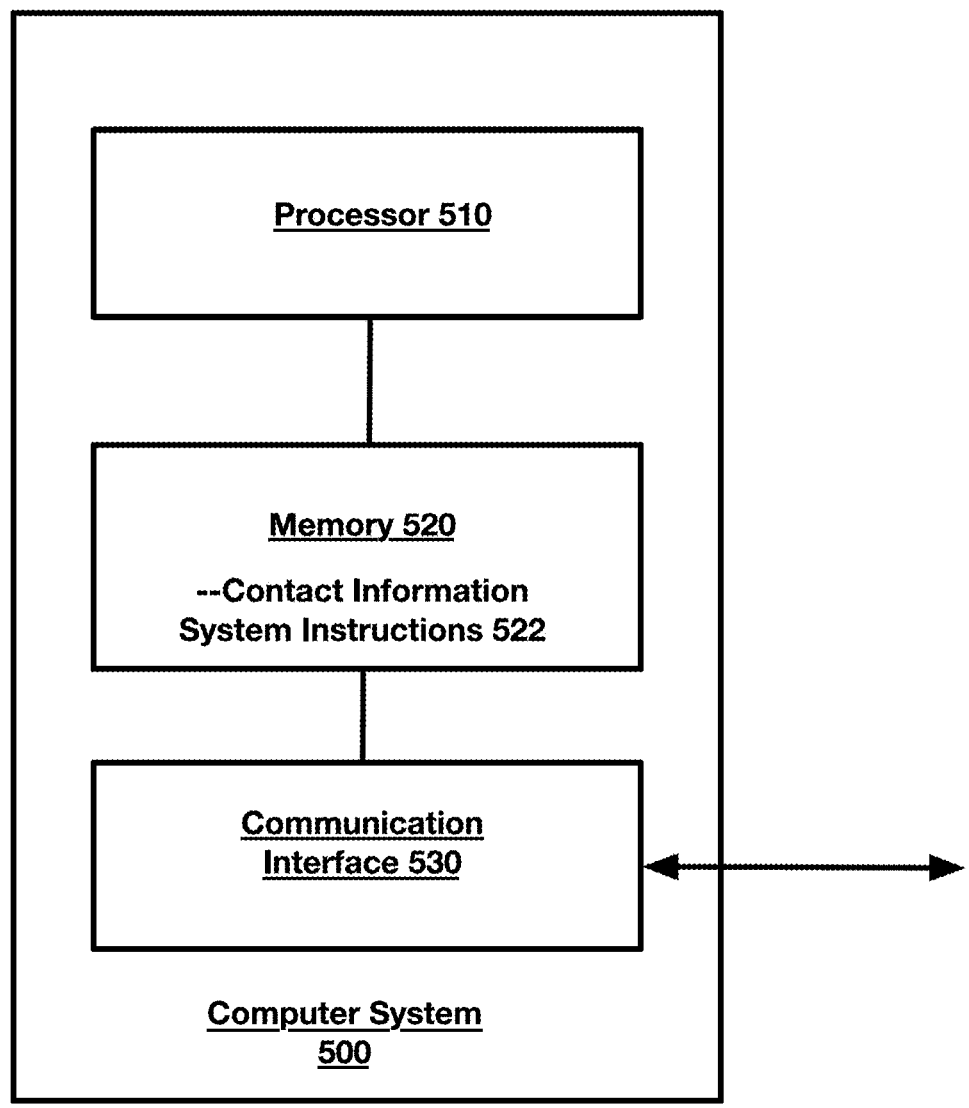
FIG. 5 illustrates a computer system on which a caller information system may be implemented.

FIG. 5 is a block diagram that illustrates a computer system upon which examples described herein may be implemented. A computer system 500 can be implemented on, for example, a server or combination of servers. For example, the computer system 500 may implement contact information system 150, as described in an example of FIG. 1.

In one implementation, the computer system 500 includes one or more processors 510, memory 520 (e.g., a read-only memory (ROM), a storage device, RAM) and a communication interface 550. The computer system 500 includes at least one processor 510 for processing information stored in the memory 520. The memory 520 also may be used for storing temporary variables or other intermediate information during execution of instructions to be executed by the processor 510. In some examples, the memory 520 stores, for example, the contact database 154, or retrieved portions of the contact database from which further processing may be performed. The memory may also store contact information system instructions 522 for implementing contact information system 150, as shown with some examples of FIG. 1.

The communication interface 550 enables the computer system 500 to communicate with end user devices (e.g., smart phones, cable boxes, personal computers) over one or more networks 680 (e.g., cellular network. PSTN, IP network) through use of the network link (wireless or wired). Using the network link, the computer system 500 can communicate with one or more computing devices, as well as computer systems of providers (e.g., cellular carriers). The processor 510 is configured with software and/or other logic, shown as caller information system instructions, to perform one or more processes, steps and other functions described with caller information service 150 of FIG. 1.

Some examples described herein are related to the use of the computer system 500 for implementing the techniques described herein. According to one example, those techniques are performed by the computer system 500 in response to the processor 510 executing one or more sequences of one or more instructions contained in the memory 520. Execution of the sequences of instructions contained in the memory 520 causes the processor 510 to perform the process steps described in connection with contact information system 150. In alternative implementations, hard-wired circuitry may be used in place of or in combination with software instructions to implement examples described herein. Thus, the examples described are not limited to any specific combination of hardware circuitry and software.

Although illustrative aspects have been described in detail herein with reference to the accompanying drawings, variations to specific examples and details are encompassed by this disclosure. It is intended that the scope of examples described herein be defined by claims and their equivalents. Furthermore, it is contemplated that a particular feature described, either individually or as part of an embodiment, can be combined with other individually described features, or parts of other aspects. Thus, absence of describing combinations should not preclude the inventor(s) from claiming rights to such combinations.

What is claimed is:

1. A method for operating a computing device, the method comprising:
   (a) determining a communication identifier of an incoming communication;
   (b) initiating a retrieval process to retrieve information associated with the communication identifier from a predetermined network location of a network authority, wherein the retrieved information is determined by a preferential setting associated with an initiator of the incoming communication, the preferential setting being previously stored in the predetermined network location of the network authority, the predetermined network location of the network authority being different from the initiator, the preferential setting specifying durations of time such that the retrieved information is business information associated with the initiator when retrieved during the durations of time, and the retrieved information is personal information associated with the initiator when retrieved outside the durations of time; and
   (c) rendering the retrieved information using the computing device.

2. The method of claim 1, wherein (a) includes determining a phone number of an incoming call, Short Message Service (SMS) message or Multimedia Message Service message (MMS).

3. The method of claim 1, wherein (a) through (c) are performed by at least one of a phone application, voice network service or messaging application.

4. The method of claim 1, wherein at least one of (a) through (c) is performed by an operating level component of the computing device.

5. The method of claim 1, wherein (a) through (c) are performed on the computing device in response to an incoming call, and while the incoming call is pending on the computing device before being answered.

6. The method of claim 1, wherein (c) includes displaying branding content of an entity that is authenticated by the network authority as being associated with a phone number of an incoming call or message.

7. The method of claim 6, wherein the branding content incudes a logo of the entity.

8. The method of claim 1, wherein (b) includes making a determination as to whether locally stored information is associated with the identifier, and then performing a network retrieval based on the determination.

9. The method of claim 8, wherein (b) is performed when the determination is that no locally stored information is associated with the identifier.

10. The method of claim 1, wherein initiating the retrieval process includes making a secure connection to the predetermined network location.

11. The method of claim 1, wherein the incoming communication is communicated to the computing device over at least one of a Public Switch Telephone Network ("PSTN"), cellular network, or Internet Protocol network.

12. The method of claim 1, further comprising:
   displaying, in connection with an incoming call or message, one or more features to perform a corresponding one or more alternative actions other than answering the incoming call.

13. The method of claim 12, wherein the corresponding one or more alternative actions includes storing contact information associated with the incoming communication.

14. The method of claim 12, wherein the corresponding one or more alternative actions includes associating a local caller block function with the communication identifier of the incoming communication.

15. The method of claim 14, further comprising blocking, using the local caller block function, a future incoming communication having a same communication identifier as the communication identifier.

16. The method of claim 1, further comprising:
   displaying a feature to enable a user to provide input about an incoming call or message to the network authority.

17. The method of claim 16, wherein the provided input includes a signal of a complaint about the incoming communication.

18. The method of claim 1, wherein (c) includes displaying the retrieved information as part of a header or message body of an incoming message.

19. The method of claim 1, wherein (b) includes communicating to a connected resource of the computing device.

20. The method of claim 19, wherein the connected resource includes another computing device.

* * * * *